United States Patent [19]

Savigny

[11] Patent Number: 5,242,652
[45] Date of Patent: Sep. 7, 1993

[54] VACUUM MOLDING PROCESS FOR MAKING A PANEL MADE OF PLASTIC MATERIAL

[75] Inventor: Francois Savigny, Le Touvet, France
[73] Assignee: Entre Prises, Le Touvet, France
[21] Appl. No.: 802,412
[22] Filed: Dec. 4, 1991

[30] Foreign Application Priority Data

Dec. 18, 1990 [FR] France .................... 90 16205

[51] Int. Cl.⁵ ............... B29C 33/40; B29C 43/10; B32B 31/04
[52] U.S. Cl. ................ 264/510; 264/571; 264/101; 264/220; 264/225; 264/257; 264/258; 264/266; 264/294; 264/316; 264/337; 264/DIG. 78
[58] Field of Search .......... 264/510, 42, 219, 220, 264/225, 257, 258, 316, 571, 101, 102, DIG. 78, 266, 294, 337

[56] References Cited

U.S. PATENT DOCUMENTS

| 1,792,486 | 2/1931 | Feinberg .............. 264/227 X |
| 3,379,812 | 4/1968 | Yakovou . |
| 3,616,057 | 10/1971 | Sachs . |
| 3,642,559 | 2/1972 | Stokes .............. 264/279.1 X |
| 3,703,572 | 11/1972 | Bellasalma . |
| 3,787,546 | 1/1974 | Pratt et al. . |
| 3,803,277 | 4/1974 | Bassett . |
| 3,950,477 | 4/1976 | DiGiacomo . |
| 4,289,724 | 9/1981 | Baynard . |
| 4,312,829 | 1/1982 | Fourcher . |
| 4,353,964 | 10/1982 | Grimm et al. .............. 264/257 X |
| 4,487,730 | 12/1984 | Larribe . |
| 4,496,511 | 1/1985 | Virgili . |
| 4,668,451 | 5/1987 | Langson . |
| 4,847,026 | 7/1989 | Jarboe et al. . |
| 4,915,896 | 4/1990 | Rachal .............. 264/257 X |
| 4,942,013 | 7/1990 | Palmer et al. .............. 264/257 X |
| 5,041,260 | 8/1991 | Johnson et al. .............. 264/257 X |
| 5,075,059 | 12/1991 | Green .............. 264/257 X |

FOREIGN PATENT DOCUMENTS

| 2422616 | 12/1975 | Fed. Rep. of Germany . |
| 2073673 | 10/1971 | France . |
| 2335664 | 7/1977 | France . |
| 1-290419 | 11/1989 | Japan . |
| 937102 | 6/1982 | U.S.S.R. . |
| 2167014 | 5/1986 | United Kingdom . |

Primary Examiner—Karen Aftergut
Attorney, Agent, or Firm—Oliff & Berridge

[57] ABSTRACT

A vacuum molding process uses a flexible molding skin having an imprint face arranged inside an airtight compartment. Before the vacuum is made, a pasty plastic material is incorporated in the compartment facing the imprint The vacuum is then made in the compartment to press the flexible molding skin onto the plastic material with formation of a molded surface with sculptures and asperities giving a decorative or functional granular appearance. The molding skin is made of a flexible anti-adhesive organic material, notably silicone, for ease of removal from the mold after the plastic material has hardened Shaping of the panel is performed after the vacuum bag has been positioned on a shaping part. The process is used for manufacturing artificial climbing wall panels.

8 Claims, 4 Drawing Sheets

VACUUM MOLDING PROCESS FOR MAKING A PANEL MADE OF PLASTIC MATERIAL

BACKGROUND OF THE INVENTION

The invention relates to a vacuum molding process of a panel made of plastic material formed in an airtight compartment linked by a tube to a vacuum pump. A prefabricated panel of plane or rough surface is generally obtained by means of a shaping casing or mold, which is filled with a pasty setting material, for example cement-based concrete, or a mixture of plastic-based synthetic material with a set proportion of charges. Manufacturing of a range of panels, notably for construction of an artificial climbing wall, requires a large series of casings or molds designed to obtain a large number of profiles. Arranging sculptures or asperities on the superficial face furthermore requires an additional operation after the casing has been filled with the pasty material. Implementation of this process is very costly.

The document U.S. Pat. No. 3,616,057 describes a molding process using the vacuum technique in an airtight compartment containing a fixed mold. Creation of a vacuum in the compartment applies a pasty plastic material against the surface of the mold. After the paste has hardened, a molded surface is obtained which follows the shape of the mold exactly. A technique of this kind requires as many fixed molds as shapes required for the molded products.

The document U.S. Pat. No. 4,312,829 refers to a molding method using a vacuum to create a cavity in a mold. After the vacuum has been made, the resin is then injected into the mold by means of an injection tube. Good distribution of the resin in the cavity results from the vacuum prevailing in the cavity. The vacuum does not have any pressing function.

SUMMARY OF THE INVENTION

The object of the invention is achieving a process for vacuum molding of panels with sculpted rough surfaces and of any shape.

The process is characterized in that it uses a flexible molding skin having an imprint face arranged inside the compartment.

Before the vacuum is made, a pasty plastic material is incorporated in the compartment facing the imprint.

A vacuum is then made in the compartment to press the flexible molding skin onto the plastic material, with formation of a molded surface with sculptures and asperities giving a granular appearance.

The molding skin is made of a flexible anti-adhesive organic material, notably silicone-based, to make it easy to remove the surface from the mold after the plastic material has hardened.

According to a first embodiment of the process, the airtight compartment is constituted by a deformable bag formed by a pair of films made of flexible plastic material. An imprint surface of the molding skin is coated by means of a coating of thixotropic pasty plastic material. To achieve a good distribution of vacuum inside the bag, the coating of plastic material is covered with a perforated strip of small thickness. Creating a vacuum inside the bag acts as a press and enables the granular structure to be obtained on the top face of the pasty plastic material. The vacuum bag is then easily transportable to perform shaping of a panel either on a shaping part or directly on a basic structure at the final location of the panel. The bag takes the shape of the shaping part or structure exactly and remains in this position until the plastic material has completely hardened. After it has been removed from the mold, a rough profile panel with a granular molded face is obtained.

The mechanical strength of the panel can be increased by placing a strengthening cloth of glass fiber base between the pasty plastic material coating and the perforated strip.

The thixotropic plastic material coating is formed by a resin concrete made up from a mixture of charges and an organic binder, notably polyester or epoxy resin based, the charges comprising:

charges of sand, silica or quartz based structure, whose granulometry ranges from 0.1 mm to 3 mm;

fibers of high mechanical strength, notably glass, carbon, or KEVLAR, representing about 10% to 20% of the total weight of the charges;

and shaped lightening charges, notably expanded glass balls whose granulometry ranges from 0.5 mm to 1 mm. The presence of the shaped lightening charges enables the sand volume and the total weight of the panel to be reduced.

According to a second embodiment of the process, overmolding of the surface of a composite panel is performed by vacuum impression. The overmolding is characterized in that a foam core of predetermined shape is used sandwiched between a pair of strengthening cloths inside the airtight compartment, that a resin coating is applied to the top face of one of the strengthening cloths, accompanied by sprinkling with mineral charges, and that the flexible molding skin is urged in the direction of the foam core when the vacuum is made in the compartment to bring about overmolding by impression of the resin coating, so as to obtain after hardening a stratified composite panel having a molded face of resin concrete. The panel is achieved in a single operation, and overmolding is rendered easier by the great flexibility of the silicone skin which follows the specific shape of the foam core perfectly. The external shaping part is not used in this second embodiment. The panel is removed from the mold after the resin has finished hardening.

BRIEF DESCRIPTION OF THE DRAWINGS

Other advantages and features will become more clearly apparent from the following description of the process according to the invention, given as a non-restrictive example only and represented in the accompanying drawings, in which.

DESCRIPTION OF THE PREFERRED EMBODIMENT

Figure 1:
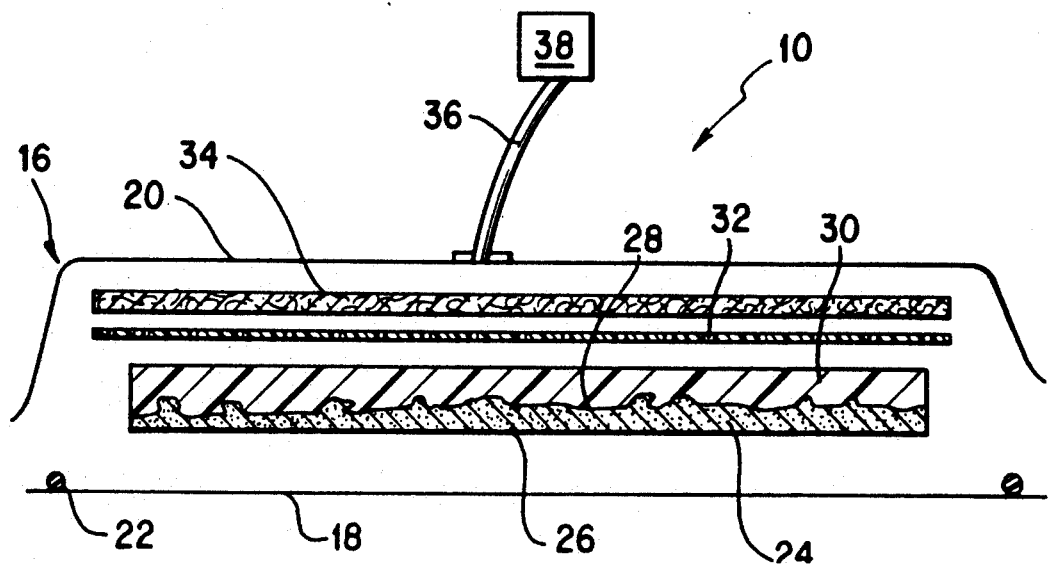
FIG. 1 is an exploded view of the first embodiment of the vacuum molding process by deformable bag.

Referring to FIGS. 1 to 5, a vacuum bag molding device 10 is used to manufacture panels 12 with rough surfaces of predetermined profiles. When it is removed from the mold, the molded face 14 of each panel 12

(FIG. 4) presents a plurality of sculptures and asperities distributed over the whole surface, so as to form either a decorative granular structure or a functional structure with hold parts used notably for construction of an artificial climbing wall.

Deformable bag 16 of the vacuum molding device 10 is formed by a pair of airtight films 18, 20 made of flexible plastic designed to come into contact with one another in the peripheral zone, with a seal 22 fitted between. The inside of the bag 16 contains a flexible molding skin 24 having a first plane face 26 applicable to the bottom film 18, and a second opposite imprint face 28 acting as support for plastic material 30 to be molded. The molding skin 24 is made of silicone or of any other anti-adhesive organic material making removal from the mold easier. A perforated plastic strip 32 of small thickness covers the plastic material 30 opposite the molding skin 24, to ensure a good distribution of the vacuum inside the bag 16. Between the perforated strip 32 and the top film 20 there is inserted a cushion 34 having a greater thickness than that of the perforated strip 32 and made of permeable material, for example felt, designed to allow the air to escape when the vacuum is applied. Making a vacuum in the bag 16 is achieved by means of an external tube 36, one of the ends of which passes tightly through the top film 20 towards the inside of the bag 16, and the other end of which is connected to a vacuum pump 38. The vacuum molding process in the bag 16 requires the use of a thixotropic pasty plastic material 30 easily applicable to the second face 28 of the molding skin 24, and remaining in place in the event of deformation of the bag 16. The plastic material 30 is formed of a resin concrete composed by a mixture of a plurality of charges and an organic binder, notably polyester or epoxy resin based. The composition of the charges is as follows (FIG. 5):

charges of sand 40, silica or quartz based structure, of different granulometries ranging from 0.1 mm to 3 mm;

fibers 42 or wires of high mechanical strength, notably glass, carbon or KEVLAR based, having predetermined lengths ranging from 5 mm to 25 mm, and representing about 10% to 20% of the total weight of the charges; and shaped lightening charges 44 comprising expanded glass balls whose granulometry ranges from 0.5 mm to 1 mm and representing 10% to 15% of the total weight of the charges and about 25% to 40% of the total volume of the charges.

After mixing, the resin 46 occupies the gaps arranged between the different charges 40, 42, 44 of the plastic material 30. The presence of the expanded glass balls as shaped lightening charges 44 enables less sand 40 to be used, resulting in a notable reduction of the weight of the panel 12. Such a composition of the pasty mixture achieves the thixotropic effect of the resin concrete material 30. In the case of a polyester resin, an accelerating agent and/or catalyst is added to enhance the reaction by catalysis after a predetermined time. In the case of an epoxy resin, a hardening agent is added in proportions specific to the required setting time.

The vacuum bag molding process is implemented as follows: after the molding skin 24 has been deposited on the bottom film 18, the second imprint face 28 is coated with the plastic material 30 to form a pasty coating of uniform thickness, which can be between 1 cm and 5 cm depending on the nature of the panel 12. The coating of material 30 is then covered by means of the perforated strip 32, and the cushion 34 is then fitted and the top film 20 positioned on the seal 22 to form the bag 16. The internal volume of the latter is then airtight with respect to the outside environment, and enables the vacuum pump 38 to be put into operation generating a large depression inside the bag 16.

Figure 4:
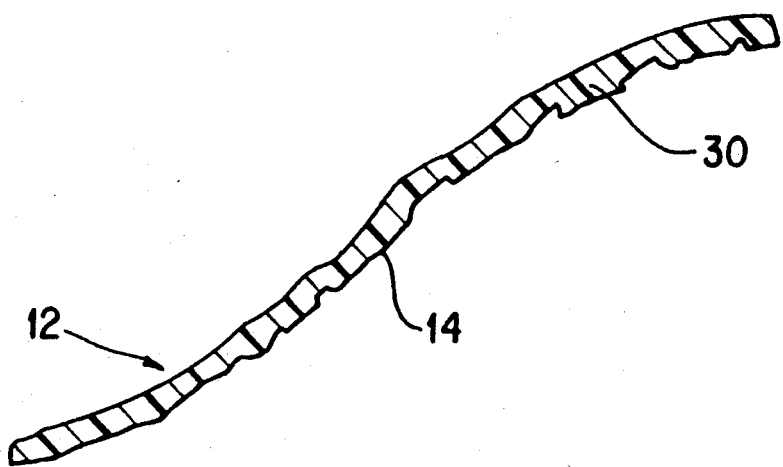
FIG. 4 shows the panel after removal from the mold.
Figure 5:
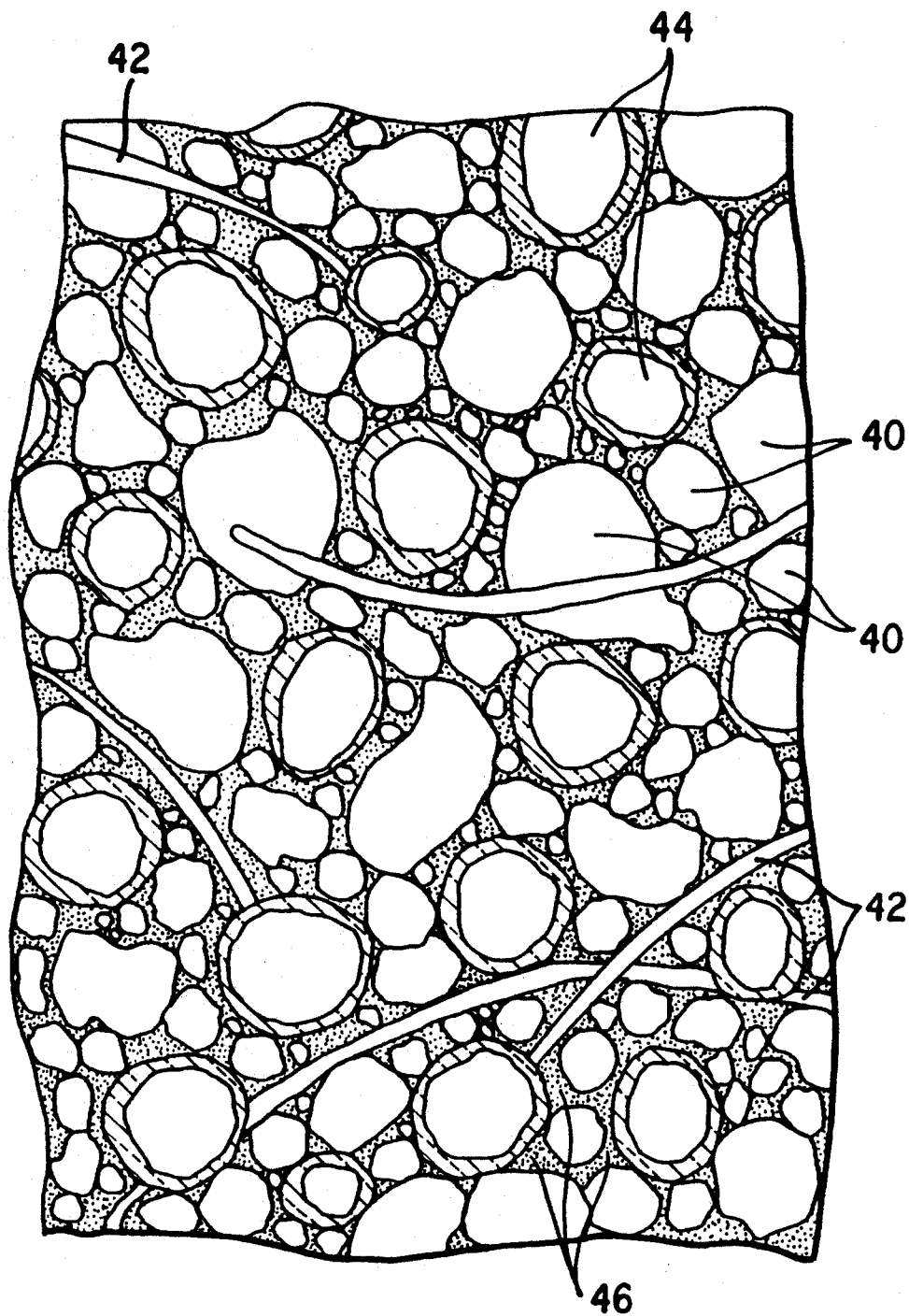
FIG. 5 represents a view under a microscope of the thixotropic plastic material.

The internal depression effect causes the two films 18, 20 to come together until the air contained in the bag 16 has been completely removed. The pasty plastic material 30 continuously follows the profile of the second face 28 of the molding skin 24 after the air bubbles have completely disappeared. The deformable vacuum bag 16 can then be arranged on a shaping part 48 (FIG. 3) whose top receiving face presents a specific profile enabling the rough surface of the panel 12 to be reproduced. The bag 16 takes the shape of this profile and remains in contact against the top face of the shaping part 48 until the plastic material 30 has fully hardened. The hardened plastic material 30 then simply has to removed from the silicone molding skin 24 to obtain the rough surface of the panel 12 (FIG. 4). The molded face 14 of the panel 12 constitutes the conjugate shape of the molding skin 24, whereas the rough profile of the panel 12 results from the deformation of the bag 16 pressing against the shaping part 48.

Instead of placing the vacuum bag 16 on a shaping part 48, it is also possible to arrange it at the final location of the future panel 12, thus ensuring perfect matching of the shapes.

Figure 2:
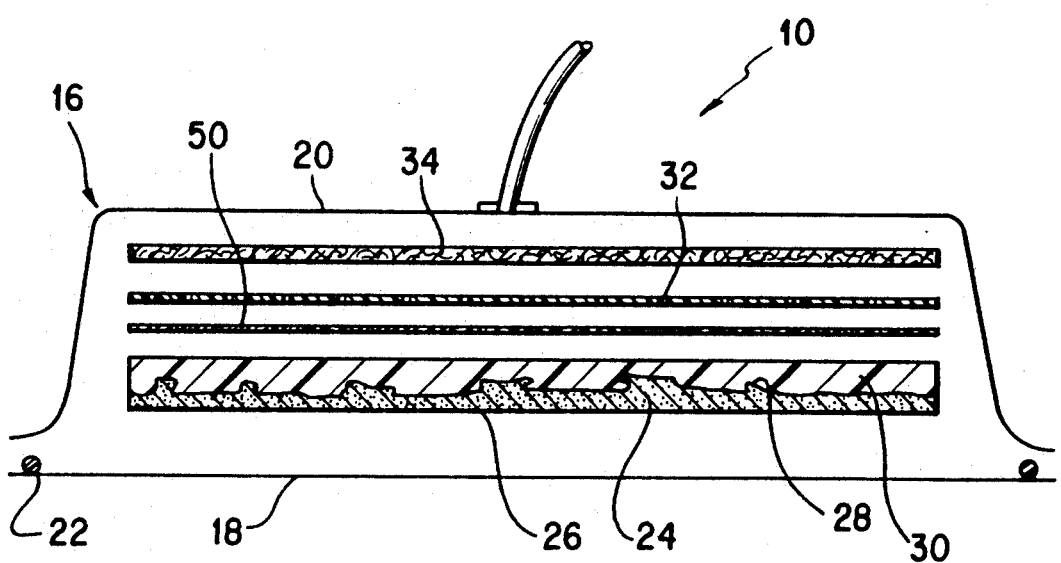
FIG. 2 is an alternative embodiment of FIG. 1.
Figure 3:
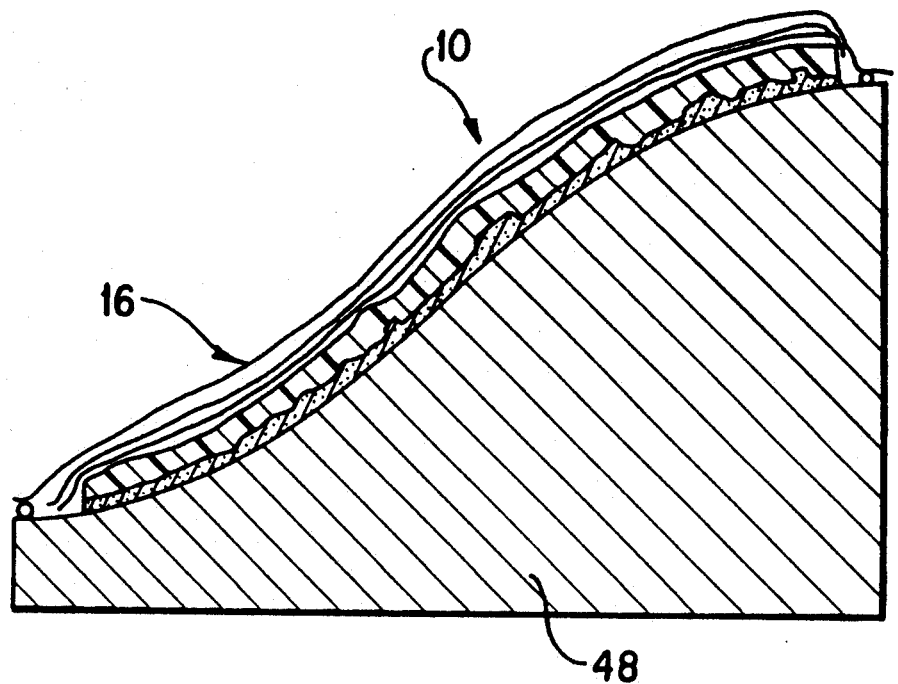
FIG. 3 represents the positioning of the vacuum bag of FIG. 1 or 2 on a shaping part.

In FIG. 2, a strengthening cloth 50, notably made of glass fiber, can be fitted between the coating of plastic material 30 and the perforated strip 32 to increase the mechanical strength of the panel 12. In this case, the resin concrete is made up using a larger dose of binder. In the course of creation of the vacuum in the bag 16, the resin passes through the glass fiber cloth 50, which will be deformed with the whole assembly when it is placed on the shaping part 48.

It can be envisaged to do away with the tight bottom film 18 of the bag 16 for certain cases involving standard panels. The first face 26 of the molding skin 24 is then positioned directly on the shaping part 48, which is equipped with the seal 22 receiving the top film 20.

Figure 6:
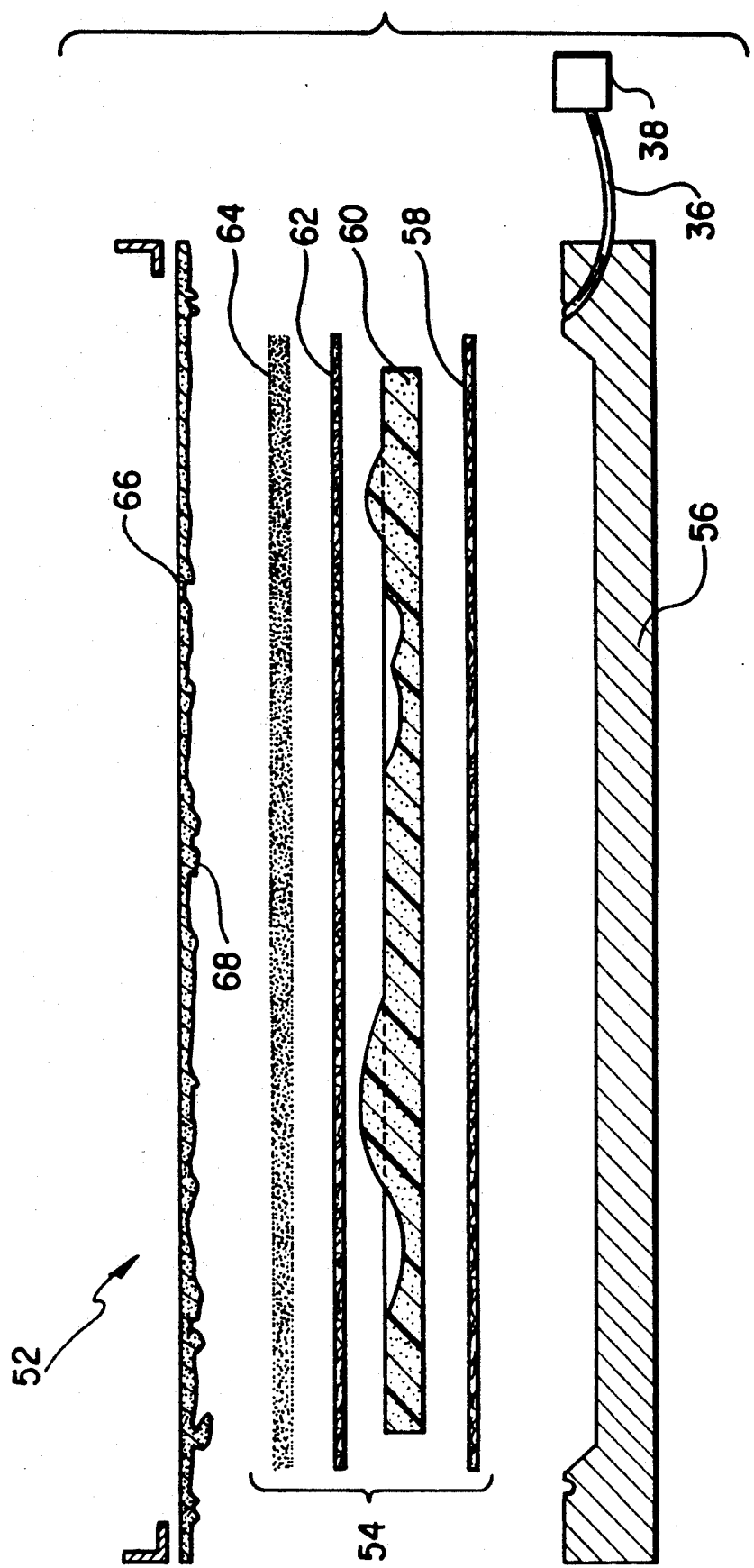
FIG. 6 is an identical view to FIG. 1 of the second embodiment of the process.

Referring to FIG. 6, the vacuum overmolding device 52 enables stratified panels 54 having a molded surface presenting a decorative or functional appearance to be manufactured. The base of the overmolding device 52 comprises a rigid mold 56 in the shape of a pan, in which a first glass fiber strengthening cloth 58, an expanded polyurethane or polyvinyl based foam core 60, and a second glass fiber strengthening cloth 62, are stacked. A coating 64 of polyester or epoxy resin is arranged on the upper face of the second strengthening cloth 62, accompanied by sprinkling with mineral charges, notably silica-based sand. Above the coating 64 there is arranged a silicone molding skin 66 having a mold face 68 whose end is designed to cooperate tightly with the periphery of the rigid mold 56 to form an airtight assembly. The inside is connected by a tube 36 to a vacuum pump 38. In the course of creation of the vacuum, the resin impregnates the strengthening cloths 58, 62, and moves up into the silica sand. The molding skin 66 is urged in the direction of the bottom mold 56 so as to obtain in a single operation a perfectly stratified composite panel 54 with a molded face made of resin concrete.

The great flexibility of the silicone skin 66 facilitates impression overmolding of the top face of the panel 54. The general structure of the panel 54 depends on the specific shape of the foam core 60, and the resin concrete overmolded surface follows the profile of the core 60 perfectly. Hardening of the resin takes place after a predetermined time, enabling the rigid panel 54 to be removed from the mold.

I claim:

1. A vacuum molding process of making a panel made of plastic material for construction of a modular artificial climbing wall, the process comprising the steps of:
   (a) providing a flexible molding skin having an imprint face, the molding skin being made of an antiadhesive organic material;
   (b) applying a coating of thixotropic pasty hardenable plastic material in an unhardened state over the imprint face of the skin;
   (c) providing a deformable bag formed by a pair of upper and lower tight films made of flexible plastic material, the deformable bag being capable of defining an airtight compartment therein;
   (d) placing the skin covered with the coating of thixotropic pasty plastic material inside the deformable bag;
   (e) covering the coating of thixotropic pasty plastic material with a perforated strip to evenly distribute vacuum pressure across the coating;
   (f) sealing the deformable bag to provide the airtight compartment between the films of the deformable bag and applying a vacuum within the airtight compartment to press the molding skin onto the coating of thixotropic plastic material forming a molded surface with sculptures and asperities for giving a corrugated external appearance to the coating of thixotropic plastic material;
   (g) placing the deformable vacuum bag on a shaping support of predetermined profile so that the deformable bag takes the shape of the profile; and
   (h) hardening the thixotropic pasty plastic material of the coating while on the shaping support and removing after hardening the hardened coating from the molding skin and the deformable bag and perforated strip so as to obtain the panel of plastic material having a molded rough profile on one face comprising the sculptures and asperities of the corrugated external appearance.

2. A molding process according to claim 1, wherein the thixotropic plastic material is formed of resin concrete made up from a mixture of charges and an organic resin binder, the charges comprising:
   charges of sand, silica or quartz based structure, having a granulometry comprised between 0.1 mm to 3 mm;
   charges of carbon or glass fibers of high mechanical strength, representing about 10% to 20% of a total weight of the charges;
   and shaped lightening charges, comprising expanded glass balls having a granulometry comprised between 0.5 and 1 mm.

3. A molding process according to claim 2, wherein the lightening charges represent 10% to 15% of the total weight of the charges and about 25% to 40% of a total volume of the charges.

4. A molding process according to claim 2, wherein an accelerating agent is added to the resin concrete.

5. A molding process to claim 2, wherein a hardening agent is added to the resin concrete.

6. A molding process according to claim 1, further comprising the step of inserting a cushion made of permeable material between the perforated strip and the upper film to allow air to escape from the compartment when the vacuum is created in the deformable bag.

7. A molding process according to claim 1, further comprising the step of inserting a strengthening cloth of glass fibers between the coating of thixotropic pasty plastic material and the perforated strip.

8. A vacuum molding process of making a stratified composite panel made of resin concrete for construction of a modular artificial climbing wall, the process comprising the steps of:
   (a) inserting a foam core of expanded polyurethane or polyvinyl between a first and a second glass fiber strengthening cloth;
   (b) placing the foam core with the first and second strengthening cloths upon a base of an overmolding device comprising a rigid mold, so that the first strengthening cloth is arranged between the foam core and the rigid mold;
   (c) applying a coating of hardenable resin in an unhardened state over an upper face of the second strengthening cloth;
   (d) sprinkling the coating with mineral charges to provide a stratified composite of the mineral charges, resin coating, first and second glass fiber strengthening cloths and foam core;
   (e) applying a flexible molding skin of silicone material over the rigid mold to provide an airtight compartment between the molding skin and the rigid mold, wherein the airtight compartment contains the stratified composite, and wherein the flexible molding skin has an imprint face directed towards the mineral charges and the coating of hardenable resin;
   (f) applying a vacuum within the airtight compartment to urge the molding skin in the direction of the coating and the foam core to bring about overmolding of the coating and the mineral charges by impression of the coating and the mineral charges with the imprint face of the molding skin against the second strengthening cloth and the foam core positioned on the rigid mold; and
   (g) hardening the coating with the mineral charges and removing the coating with the mineral charges, first and second strengthening cloths and the foam core from the rigid mold and the flexible molding skin so as to obtain the stratified composite panel having a molded face of resin concrete with sculptures and asperities for giving a corrugated external appearance to the molded face of the panel caused by the impression of the imprint face against the mineral charges and hardenable resin coating.

* * * * *